Nov. 23, 1948.   W. F. PENROSE   2,454,291
BRAKE CONTROL APPARATUS
Filed July 31, 1945   3 Sheets-Sheet 1
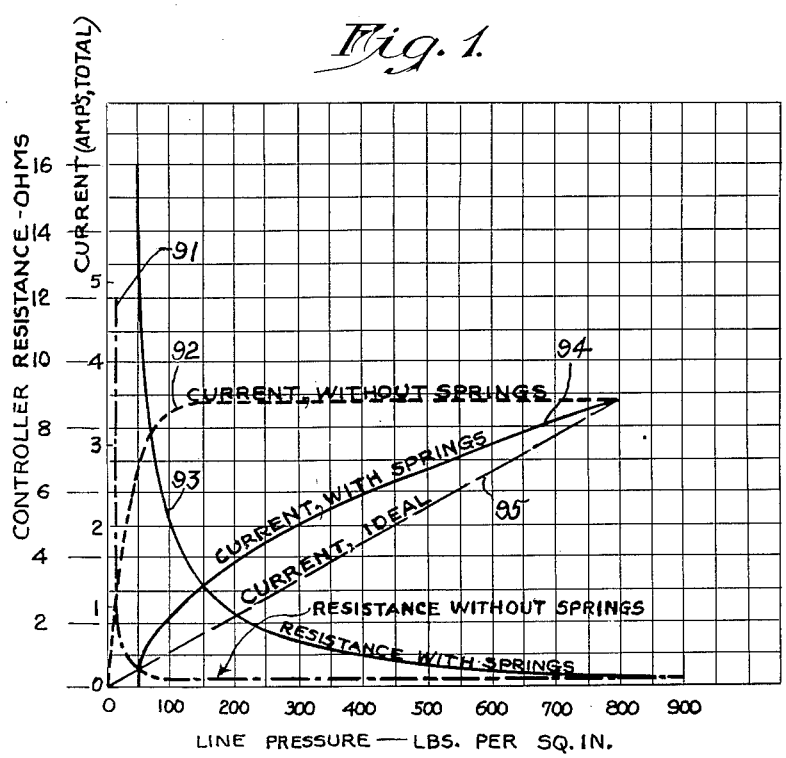
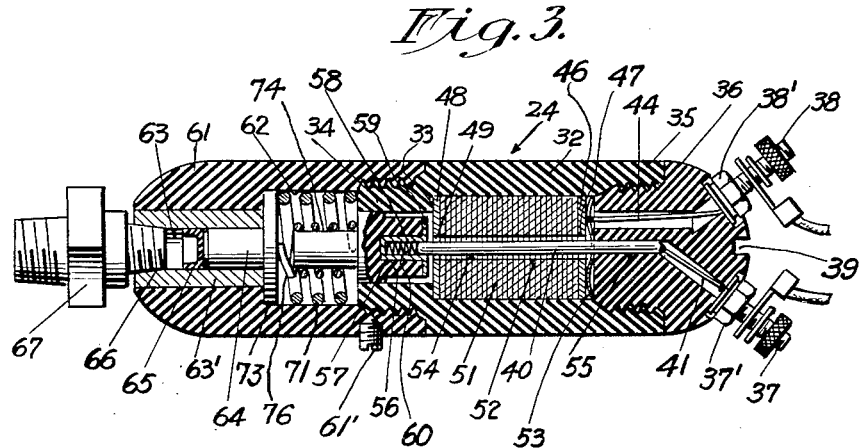
INVENTOR
WILLIAM F. PENROSE
BY
Pennie, Davis, Marvin and Edmonds
ATTORNEYS Nov. 23, 1948.                W. F. PENROSE                2,454,291
                           BRAKE CONTROL APPARATUS
Filed July 31, 1945                                  3 Sheets-Sheet 2

INVENTOR
WILLIAM F. PENROSE
BY
Pennie, Davis, Marvin and Edmonds
ATTORNEYS

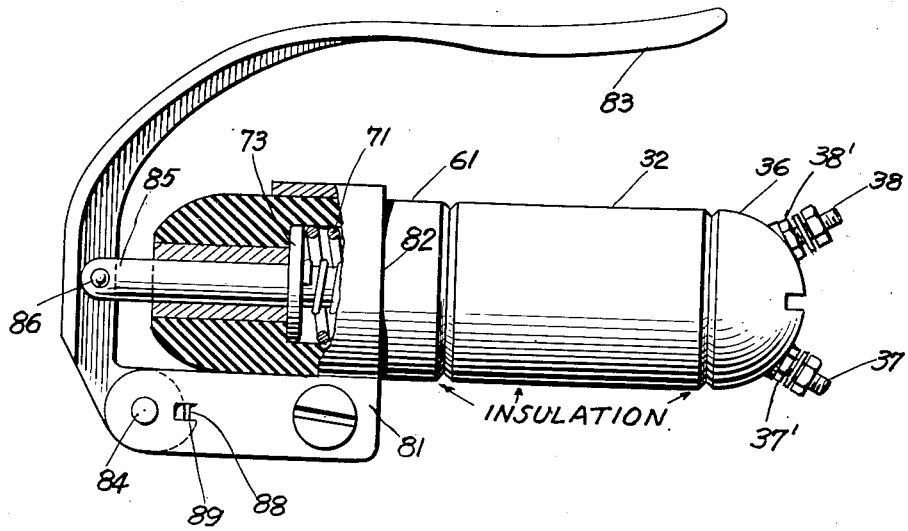
Fig. 9.
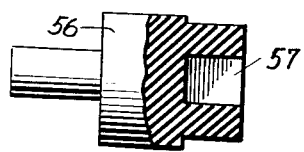 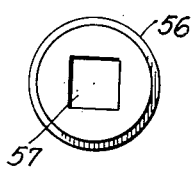 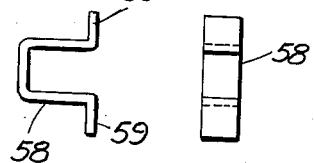
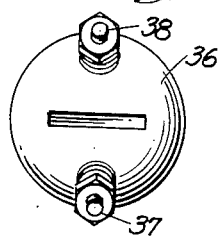
INVENTOR
*WILLIAM F. PENROSE*
BY
*Pennie, Davis, Marvin and Edmonds*
ATTORNEYS Patented Nov. 23, 1948

2,454,291

UNITED STATES PATENT OFFICE 2,454,291

BRAKE CONTROL APPARATUS

William F. Penrose, Summit, N. J., assignor to Empire Electric Brake Company, a corporation of New Jersey Application July 31, 1945, Serial No. 608,031

7 Claims. (Cl. 201—51)

This invention relates to braking systems for a train of vehicles and particularly to systems wherein electromagnetically-actuated brakes on a trailer or trailers are controlled in relation to and by the fluid pressure developed upon application of the brakes of an hydraulic brake system on a tractor vehicle.

The principal object of the invention is to provide a simple and economical control apparatus for the electromagnetically-actuated, so-called "electric," brakes of trailers that will cause deceleration and stopping of the trailer or trailers to be effected in proper timed and brake-force relation to the application of the hydraulic brakes on the tractor. Tire wear on both vehicles due to braking thus may be minimized by being properly distributed therebetween. If an undue proportion of the braking is done by one vehicle, its tire wear will be increased and the deceleration and stopping of the vehicles will be jerky instead of smooth, as a result of which skidding or jackknifing may result.

The problem is not merely to provide equal braking action on the trailer and leading vehicle, since one may be much heavier than the other and therefore may require more braking action, but rather to provide related rates of brake-force application on the two vehicles when the hydraulic brake pedal of the tractor is depressed by the operator. If brakes are lightly applied to the tractor or leading vehicle, according to the invention they may be lightly applied to the trailer, and if the braking action on the leading vehicle be increased, an increase in braking action in related manner may be brought about on the trailer.

In order to provide an anchor or drag effect, it is good practice to have the trailer brakes applied slightly in advance of those of the tractor. This time relation between the two braking efforts is particularly effective to reduce any tendency of the trailer and tractor combination to jack-knife.

An auxiliary variable resistance or load control connected in series with the rheostat which constitutes the normal operating electric brake control may be arranged on the tractor, available for ready adjustment by the driver or operator, by means of which any desired relation of trailer braking to tractor braking, within reasonable limits, may be maintained, to adapt the operation of the braking system to different ratios of trailer-to-tractor loading.

Fluid pressure in the hydraulic or other fluid braking system is analogous to the voltage applied to the brake-operating magnets in the electric braking system. The problem of operating the two braking systems together, therefore, reduces to that of causing the operating current in the electric system, to which the voltage applied to the magnets is proportioned, to vary smoothly and approximately in proportion to the pressure in the hydraulic system. Certain practical considerations, however, must be taken into account, such as the necessity of limiting to a reasonable amount the volume of fluid withdrawn from the hydraulic system to control the electric brakes, and the need to provide rugged and economical electric control apparatus suitable for any type vehicle.

Inasmuch as trailer brakes may be supplied with electric power most conveniently from a storage or dry battery or other source of substantially constant voltage, a variable resistance (rheostat), or the like, is employed in the electric brake control circuit to regulate the amount of current supplied to the brake electromagnets. A reliable form of continuously variable rheostat sufficiently rugged for vehicular service is the carbon-pile compression-rheostat, in which the flow of current is controlled by varying the pressure on a pile or stack of resistor disks or elements which may be made of carbon or some similar material.

As pressure is applied to a carbon-pile rheostat, from zero pressure upwardly, the current, in a circuit having a constant voltage supply and in which the rheostat constitutes the principal resistance element, increases very rapidly at first, then more slowly, as shown by the upper dotted curve in Fig. 1, the increase of current being proportionately less as the applied pressure increases, until the current eventually remains substantially constant. It will be observed that for smooth operation it would be unsatisfactory to apply the full fluid pressure developed in an hydraulic braking system directly to a carbon-pile rheostat in the electric braking circuit, since a slight application of the hydraulic brakes would result in relatively strong application of the electric brakes and thereafter, an increase in hydraulic braking force would not result in a proportional increase in electric braking force.

In accordance with the present invention, by the introduction of non-linear pressure transmission means, the pressure of the hydraulic system is modified before being applied to the pressure-sensitive carbon pile of the control rheostat in a manner to compensate for the undesirable pressure-current characteristic of the compression-rheostat when used alone, the low pressures being relatively decreased and the high pressures being relatively increased. Thus, the desired result, the provision of an electric current the variation of which is in substantially linear relation to the hydraulic pressure actuating a carbon-pile rheostat, is achieved.

Other objects and advantages of the invention will be more particularly pointed out in the specification, with reference to the accompanying drawings, in which:

Fig. 1 shows curves of current and resistance plotted against hydraulic line pressure for a compression-type rheostat controller with and without interposed springs, and an ideal linear current characteristic;

Fig. 3 is a view in cross-section of one form of the hydraulically-actuated controller of the invention;

Fig. 4 is an end view of the controller of Fig. 3, looking from the right;

Figs. 5 and 6 are, respectively, enlarged side and end views of the plunger of the controller, the former partly in section;

Figs. 7 and 8 are, respectively, enlarged side and end views of the plunger contact;

Fig. 9 is a side view, partly in section, of a hand-operated controller similar in construction and arrangement to the controller of Fig. 3.

Figure 2:
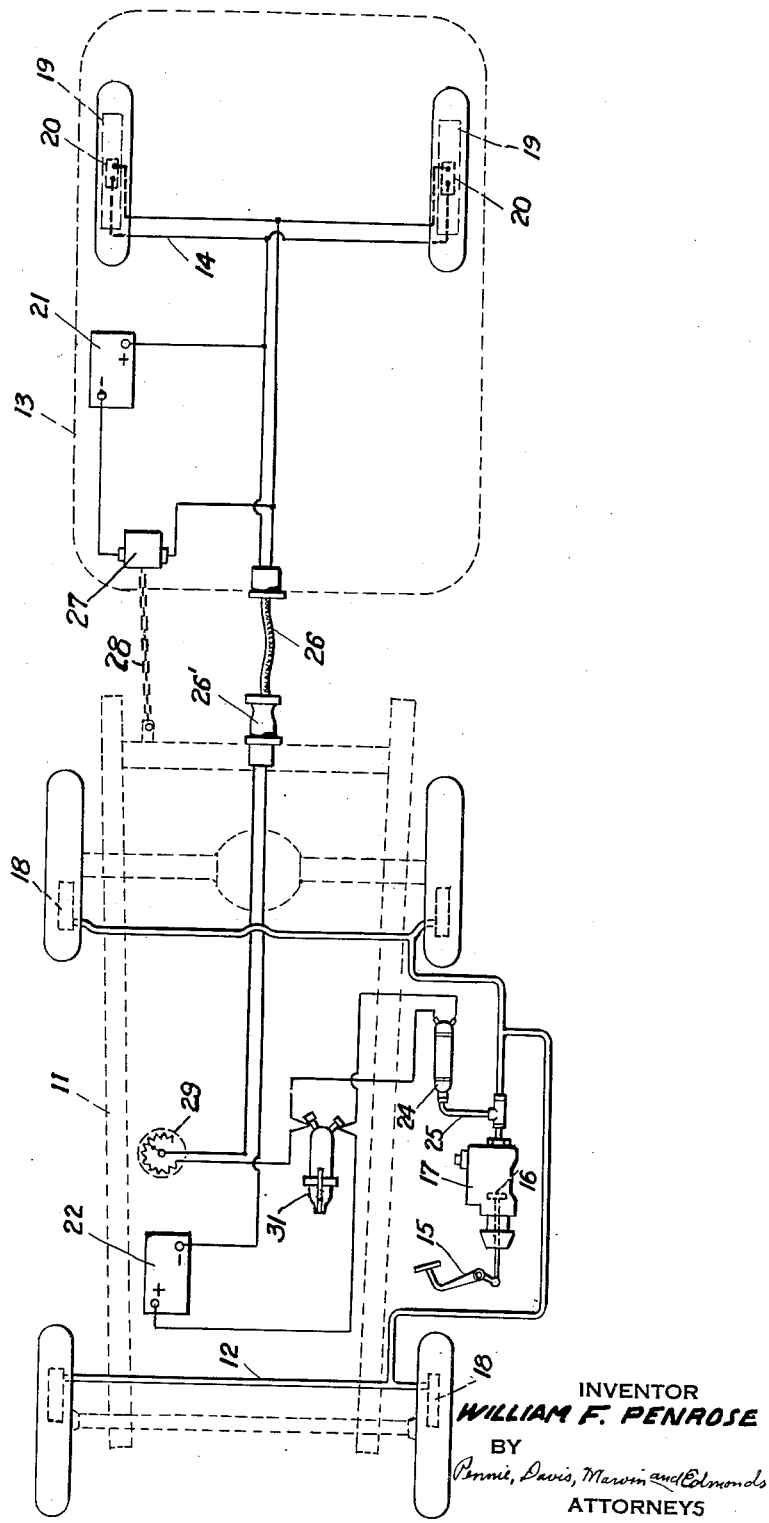
Fig. 2 is a schematic illustration of a tractor and trailer brake control system employing an hydraulically actuated compression-rheostat in accordance with the invention.

Referring to Fig. 2 a tractor 11 equipped with a conventional four-wheel hydraulic brake system 12 is shown connected to a trailer 13 having an electromagnetically-actuated brake system 14. The tractor brake system 12 includes a foot pedal 15 arranged to operate a piston 16 in a master cylinder 17 to force fluid from this cylinder and distribute it under pressure to auxiliary brake cylinders 18 at each wheel. With cylinders 18 there may be associated pistons and other conventional brake operating members, not shown.

The electric brake system 14 of trailer 13 includes brakes 19 which may be of the electromagnetically-actuated type described in my Patent No. 2,273,065, dated February 7, 1942. The electrically energized magnets 20 of two such brakes, preferably connected in parallel as indicated in Fig. 2, normally receive current from tractor battery 22. Working control of this current, to govern the braking effort of brakes 19, is by means of an hydraulically-actuated electric controller including a compression-rheostat 24, preferably serially connected in the brake circuit. Rheostat 24, to be presently described in detail, is actuated by fluid under pressure from the hydraulic brake system 12 through a line 25. An increase of hydraulic pressure to operate the tractor hydraulic brakes is thus caused, through the actuation of rheostat 24, to supply current of adjustable strength from battery 22 to the operating magnets of trailer brakes 19 for controlled operation of these brakes. Electrical connection between tractor 12 and trailer 13 is provided by a cable assembly 26 including a separable connector 26'.

A normally open-circuited safety switch 27 is mounted on the trailer having an operating member connected by a slack chain 28 to the tractor. Should the trailer break away from the tractor for some reason, such as failure of the coupling means, causing separation of the mating contact members of connector 26' or rupture of cable 26, switch 27 is operated to a closed-circuit condition by chain 28 and current to set brakes 19 is supplied to the operating magnets thereof from trailer battery 21.

An adjustment of the maximum current which can be supplied to brakes 19 by the operation of controller rheostat 24 is provided by an adjustable load controller including a rheostat 29. The effective resistance of rheostat 29, as determined by the setting of the movable contact member thereof, limits the current supplied to the brakes when rheostat 24 is operated to its position of minimum resistance and thereby regulates the maximum brake torque that can be developed. The setting of rheostat 29 is made in accordance with the size and load of the trailer or trailers.

For actuating trailer brakes 19 independently of the actuation of the tractor brakes there is connected in parallel with hydraulically-operated controller 24 a hand operated controller including a compression-rheostat 31. This hand operated controller is similar to hydraulically-operated controller 24 in construction and principle of operation but has a different actuating mechanism. Both controllers preferably comprise compression-rheostats of the carbon pile type.

The details of hydraulically operated controller 24 are shown in Figs. 3 to 8. This controller includes a cylindrical body member or casing 32 of insulating material having an axially disposed cylindrical bore comprising two sections of different diameter separated by a shoulder 33. At one end the casing has an externally threaded portion 34 and at the opposite end an internally threaded portion 35, the latter adapted to receive a threaded closure member or plug 36 likewise of insulating material in which are supported a pair of electric terminals 37, 38.

Plug 36 may be tightly screwed into casing 32 with the aid of a special tool adapted to engage an external slot 39 provided for that purpose in the spherical end of the plug.

Terminal 37 is in electrical connection with a central rod 40 of conducting material by way of a wire 41 soldered to the rod and secured under clamping nut 37' of the terminal, the wire extending through a suitable hole in the plug. Terminal 38 likewise has a connecting wire 44, secured under clamping nut 38', which extends through a longitudinal hole in the plug and is soldered at the end opposite the terminal to a circular contact plate 46 of conducting material, such as copper having a central opening 47 therein.

Plate 46 together with a similar plate 48 having a central opening 49 therein and bearing against shoulder 33 form the end boundaries of a pressure-sensitive pile or stack of disks 51 of carbon or similar resistance material having openings 52 therein aligned with openings 47, 49 in contact plates 46, 48, respectively. Plug 36 when screwed into the threaded portion 35 of casing 32 with the shoulder on the plug brought home against the end of the casing is adapted to retain disks 51 and plates 46, 48 in the casing under light pressure provided by spring washer 53.

The aligned openings in the carbon disks and end contact plates define a continuous cylindrical passage 54 which is of appreciably larger diameter than rod 40 to provide clearance thereabout. Rod 40 is centered within passage 54 by having a portion at one end pressed into a central hole 55 in plug 36 and having the other end centrally supported by a plunger 56 slidable in the bore of casing 32. Plunger 56 is of insulating material and has a recess 57 of square cross-section which is adapted to receive a U-shaped contact 58 of copper or other conducting material, Figs. 5 to 8. Contact 58 has outwardly flared portions 59 normally spaced from contact plate 48 but adapted to provide good electrical contact therewith when pressure is exerted against plunger 56 tending to move the plunger to the right, against the force of a conducting spring 60, seated in contact 58 and bearing against stationary rod 40. When contact members 59, 48 are in spaced relation connection between terminals 37 and 38 is broken.

A cylindrical extension or cap member 61 of insulating material in threaded engagement with the externally threaded portion 34 of casing 32 and locked thereon by a set screw 61' has a central cylindrical recess 62 coaxial with and of larger diameter than the adjacent portion of the bore of casing 32. Recess 62 communicates at one end with an axial bore 63 of smaller diameter in a metal insert 63' molded in cap 61 and forming an operating cylinder for a piston 64, which mounts at one end a sealing cap or washer 65 of rubber of other flexible material to prevent fluid leakage past the piston. Cylinder 63 is internally threaded at the end 66 thereof to receive a hydraulic fitting 67 adapted, in turn, to receive tubing forming a portion of line 25 connecting with tractor hydraulic brake system 12 to communicate the hydraulic pressure of this system to piston 64. The operating range of hydraulic pressures may be, for example, from 50 to 800 lbs. per square inch.

To transmit a portion of the variable hydraulic line pressure in non-linear relationship to the compressible stack of carbon disks 51, pressure transmission means, having a non-linear pressure-displacement characteristic are employed comprising two coaxially disposed compression springs, preferably of different stiffness. The outer and preferably relatively stiff spring 71 is retained in recess 62 with one end abutting the end of the threaded portion of the casing 32 and the other end abutting a solid axially movable plate or plunger 73 for which the left-hand shoulder of recess 62 serves as a stop in the non-operated condition of the controller and against the other side of which piston 64 bears. Plunger 56, guided in the central bore of casing 32, has a cylindrical projection 74 centering and supporting one end of the inner and preferably relatively weak spring 76 of the pair of coaxial springs. The other end of spring 76 bears against plunger 73.

By the described arrangement a portion of the hydraulic pressure acting on piston 64 is transmitted, by displacement of piston 64 and plunger 73 and the stressing of spring 71, to the casing, to be resisted by the reaction thereof, while simultaneously another portion of the pressure is transmitted to plunger 56 by the stressing of spring 76. Pressure on plunger 56, in opposition to the pressure of spring 60 initially causes the plunger to be displaced toward the right to close the gap between the outwardly flared portions 59 of contact 58 and contact plate 48, thereby placing terminal 37 in electrical connection with plate 48 by way of rod 40 and conducting spring 60 and completing the circuit between terminals 37 and 38 through the carbon pile 51. Subsequent increase of pressure on plunger 56 tends to compress the carbon pile and lower the electrical resistance thereof.

Conducting spring 60 is strong enough, when no hydraulic pressure is applied to piston 64, to keep plunger 56 in a position which inserts the gap between plate 48 and contact 58 referred to above and break the circuit between terminals 37 and 38. Plunger 73 in its movement to the right to compress springs 71 and 76 may eventually engage the face of plunger 56 if the hydraulic pressure is high enough, or in case of failure of the inner spring 76. Positive actuation of plunger 56, as a safety feature, is thereby provided.

The non-linear pressure transmission characteristic of the transmission means comprising the pair of coaxial springs 71, 76 is due to the respective manners in which the springs are restrained, which cause differently varying stresses to be set up in the two springs as corresponding ends thereof are simultaneously displaced by plunger 73. In the case of the outer spring 71 the end of the spring opposite plunger 73 is rigidly restrained against axial displacement by its abutment against stationary means and the compressive stress induced in the spring by displacement of plunger 73 is therefore directly proportional to such displacement. In the case of inner spring 76 the end of the spring opposite plunger 73 is only yieldingly restrained by plunger 56, after the gap between contact 58 and plate 48 is closed, because of the compressibility of stack 51 and therefore the compressive stress in the spring is not directly proportional, i. e. not linearly proportional, to the displacement of plunger 73. Since the displacement of plunger 73 may be considered to vary in substantially linear relation to the hydraulic pressure acting on piston 64, it will be apparent that the pressure exerted on the carbon pile by way of spring 76 and plunger 56 is in non-linear relation to the hydraulic pressure, due to the above referred to non-linear relation between the stress in spring 76 and the displacement of plunger 73.

The characteristic curves of Fig. 1 illustrate the improvement in operation of the controller rheostat effected by the introduction of this non-linearity in the transmission of the hydraulic line pressure to the pressure-sensitive element of the controller. Line pressures are measured along the axis of abscissae for all curves.

Curve 91 shows the variation of resistance of a compression-rheostat, similar in construction to that in the controller of Fig. 3, with variation of hydraulic line pressure, when the pressure is applied directly to the carbon pile of the rheostat without intermediate non-linear spring means. It will be noted that substantially the entire change of resistance which occurs with change of pressure takes place between zero pressure and a pressure of 100 lbs. per square inch, which is a small fraction of the operating range of the hydraulic brake pressure. Correspondingly in curve 92, which shows the change of current in a circuit including the above controller together with the windings of brake magnets of selected characteristics and a source of selected voltage, substantially the entire change of current occurs between these limits.

Curve 93 is the resistance characteristic of a controller of the type shown in Fig. 3, which includes the non-linear spring means shown therein, comprising springs 71 and 76. The stiffness of the outer spring 71 in this controller is four times that of the inner spring 76. The resistance characteristic of curve 93 shows that the change of resistance is spread out over the entire operating range of hydraulic brake pressures, 50 to 800 lbs. per square inch. The current characteristic corresponding to resistance characteristic 93 is shown as curve 94. It will be noted that due to the wider pressure range over which the current change takes place the current characteristic over a large portion of the operating range becomes substantially linear. For purposes of comparison an ideal linear characteristic 95 is shown in the figure as a dashed line.

Referring to Fig. 9 there is shown a hand-operated controller which includes a compression-rheostat generally similar to that shown in Fig. 3 and which includes the casing 32, terminal plug 36 and cap member 61 shown in that figure. A bracket 81 secured by a clamping ring 82 thereof to the cap member 61 serves as a support for a curved hand lever 83 pivoted to the bracket at 84 and extending around the end of and along the side of the controller. This construction enables the operator simultaneously to grasp the lever and the controller casing to obtain a purchase when operating the controller.

In this embodiment of the invention piston 64 is dispensed with and its place is taken by an operating pin 85 guided in cylinder 63 which abuts plate or plunger 73. Lever 83 is pivotally connected to pin 85 at 86 and as the lever is rotated about stationary pivot point 84 pin 85 is moved toward the right to displace plunger 73 and compress springs 71, 76 and thereby apply pressure to the compression rheostat by way of spring 76 and associated members seen in Fig. 3. A stop pin 88 may be provided to engage a projection 89 on lever 83 to limit the movement of the lever about pivot point 84 in a counterclockwise direction.

The invention disclosed herein provides brake control apparatus by which an electromagnetically-actuated brake system is controlled, either in dependence upon the operation of an hydraulic brake system or independently, through the operation of compression-rheostats with which are associated means for compensating for the otherwise unsuitable characteristics of such rheostats, particularly of the carbon-pile type. There has also been disclosed a method of operation of a compression rheostat by an externally applied pressure which results in a substantially linear variation of current with pressure, this method of operation finding application to a described tractor-trailer brake system but not being limited thereto.

While preferred embodiments of the invention have been shown and described herein it is to be understood that such embodiments are by way of illustration, the invention being limited only by the appended claims.

I claim:

1. A fluid pressure actuated compression electric rheostat comprising a casing, a plurality of resistance elements arranged in pile contact relation within said casing at one end thereof, compression of which varies the effective electrical resistance between the ends of the pile thereof, means providing electrical contact with the ends of the said pile and electrical connections thereto respectively, plunger means for applying pressure to one end of said resistance element pile, a cylinder disposed within said casing at the other end thereof, a piston in said cylinder, means to connect said cylinder and said piston to a source of fluid pressure, spring means opposing the movement of said piston upon the application of fluid pressure to said cylinder, and a second spring means independent of said first interposed between said piston and plunger and adapted to transmit pressure resiliently from said piston to said plunger to drive the latter.

2. A fluid pressure plunger actuated compression electric rheostat comprising a circular cylindrical casing, a plurality of carbon disk resistance elements arranged in symmetrical pile contact relation within said casing, compression of which varies the effective electrical resistance between the ends of the pile thereof, means providing electrical contact with the ends of the said pile and electrical connections thereto respectively, plunger means for applying pressure to one end of said resistance element pile, a cylinder disposed at one end of said casing coaxial therewith, a piston in said cylinder, means to connect said cylinder and said piston to a source of fluid pressure, cylindrical compression-spring means opposing the movement of said piston upon the application of fluid pressure to said cylinder, and a second compression-spring means disposed within said first and interposed between said piston and plunger and adapted to transmit pressure resiliently from said piston to said plunger to drive the latter.

3. A plunger actuated compression electric rheostat comprising a casing, a plurality of resistance elements arranged in pile contact relation within said casing at one end thereof, compression of which varies the effective electrical resistance between the ends of the pile thereof, means providing electric contact with the ends of the said pile and electrical connections thereto respectively, plunger means for applying pressure to one end of said resistance element pile, a second plunger arranged at the other end of said casing in coaxial relation with said first plunger, compression-spring means opposing the movement of said second plunger, a second compression-spring means independent of said first interposed between said plungers and adapted to transmit pressure resiliently from said second plunger to said first to actuate said rheostat.

4. A plunger actuated compression electric rheostat comprising a casing, a plurality of carbon disk resistance elements arranged in pile contact relation within said casing at one end thereof, compression of which varies the effective electrical resistance between the ends of the pile thereof in non-linear manner relative to the pressure applied to the pile, means providing electrical contact with the ends of the said pile and electrical connections thereto respectively, plunger means for applying pressure to one end of said resistance element pile, a second plunger arranged at the other end of said casing in coaxial relation with said first plunger, spring means opposing the movement of said second plunger, a second spring means independent of said first interposed between said plungers and adapted to transmit pressure resiliently from said second plunger to said first to actuate said rheostat.

5. In a rheostat comprising a compressible pressure-sensitive resistance element, terminal means therefor normally in open circuit relationship, contact means for closing said circuit, pressure transmitting means for applying pressure to said element in non-linear relationship to a variable externally applied pressure including a pair of coaxial helical springs of unequal stiffness, a member displaceable in accordance with said external pressure for simultaneously stressing said springs, stationary means providing a reaction against the stiffer of said stressed springs and means actuated by the weaker of said stressed springs to operate said contact means to a closed position and subsequently exert pressure on said pressure-sensitive element to vary the resistance between said terminals, said pressure being a function of the compressibility of said element.

6. In a rheostat of the carbon-pile type having a stack of axially aligned carbon disks and terminal means respectively in electrical connection with the two ends of the stack, stationary means preventing displacement of one end of said stack and pressure actuated means adapted to displace the other end thereof to compress the stack and vary the electrical resistance between said terminals including a pair of helical springs having parallel axes, a member abutting corresponding ends of said two springs and displaceable axially thereof, the end of said one spring opposite said member engaging said stationary means and the end of said other spring opposite said member engaging means adapted to transmit displacement thereof to a portion of said stack opposite the end engaged by said stationary means.

7. In a rheostat of the carbon-pile type having a stack of axially aligned carbon disks, terminal means respectively in electrical connection with the two ends of the stack and stationary means preventing displacement of one end of said stack fluid pressure actuated means adapted to displace the other end thereof to compress the stack and vary the resistance between said terminals, including a pair of coaxial coiled springs of different stiffness, a displaceable member abutting corresponding ends of said two springs and adapted jointly to compress said springs under the influence of fluid pressure, the end of the stiffer of said two springs opposite said member engaging said stationary means and the end of the weaker of said two springs opposite said member engaging means adapted to transmit displacement thereof to the end of said stack opposite that engaged by said stationary means.

WILLIAM F. PENROSE.

REFERENCES CITED

The following references are of record in the file of this patent:

UNITED STATES PATENTS

| Number | Name | Date |
|---|---|---|
| 1,818,920 | Minturn | Aug 11, 1931 |
| 1,944,205 | Apple | Jan. 23, 1934 |
| 2,215,172 | Christensen | Sept. 17, 1940 |
| 2,248,301 | Krause | July 8, 1941 |
| 2,260,641 | Reid | Oct. 28, 1941 |
| 2,283,378 | Liner | May 19, 1942 |